May 2, 1950     H. C. RIEMANN ET AL     2,506,108
VEHICLE WINDSHIELD VISOR
Filed Nov. 25, 1946     3 Sheets-Sheet 1
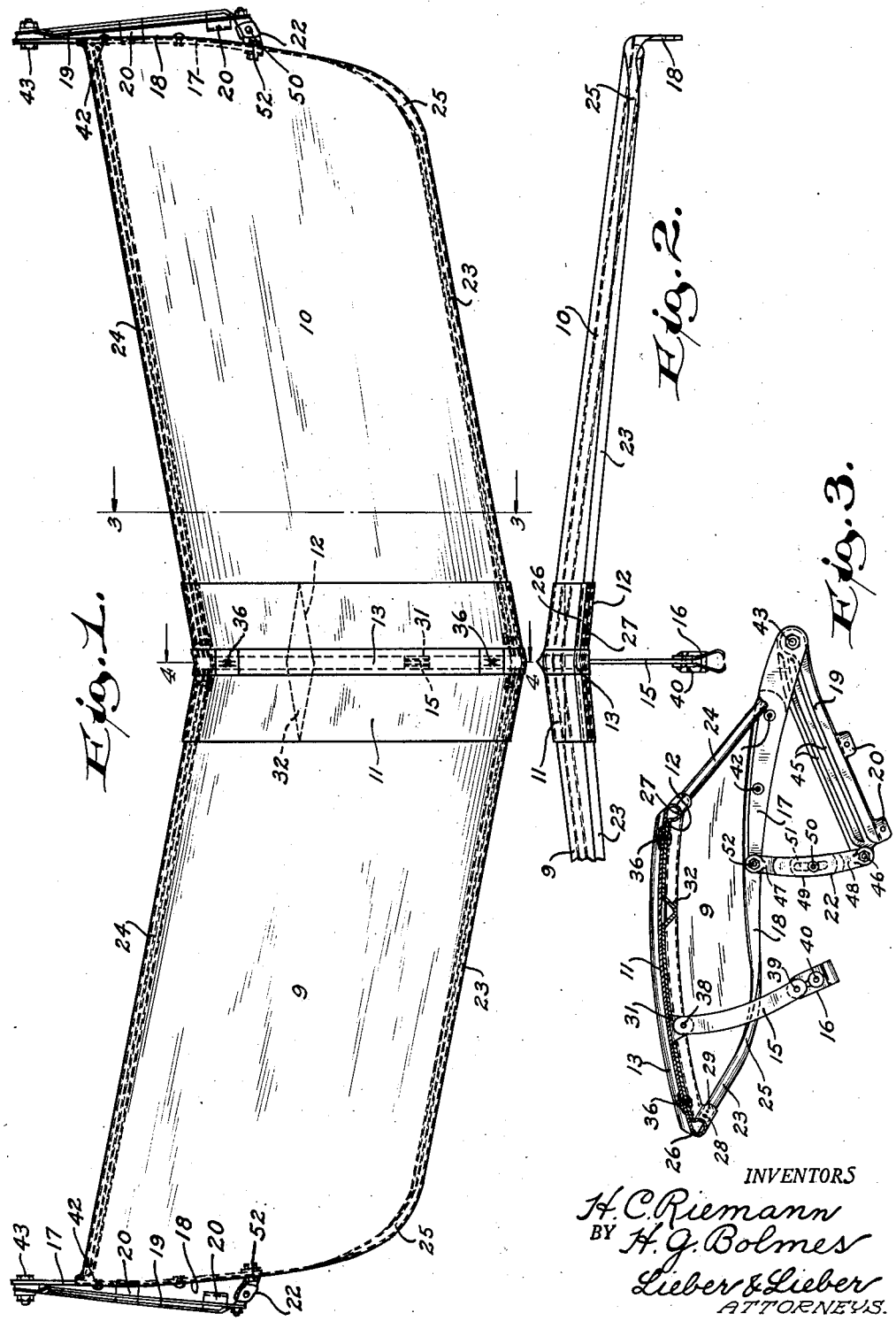

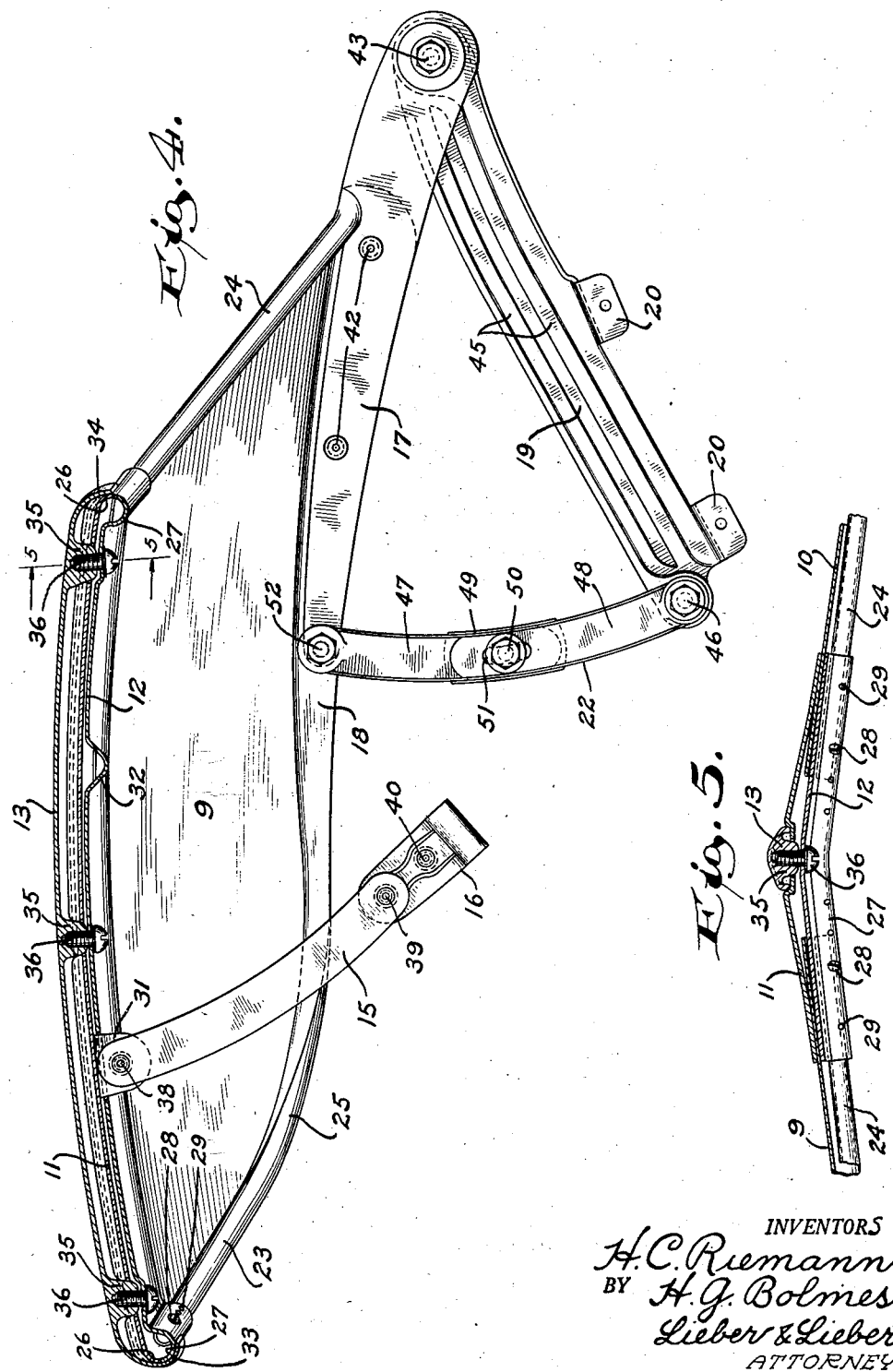

May 2, 1950  H. C. RIEMANN ET AL  2,506,108
VEHICLE WINDSHIELD VISOR
Filed Nov. 25, 1946  3 Sheets-Sheet 3
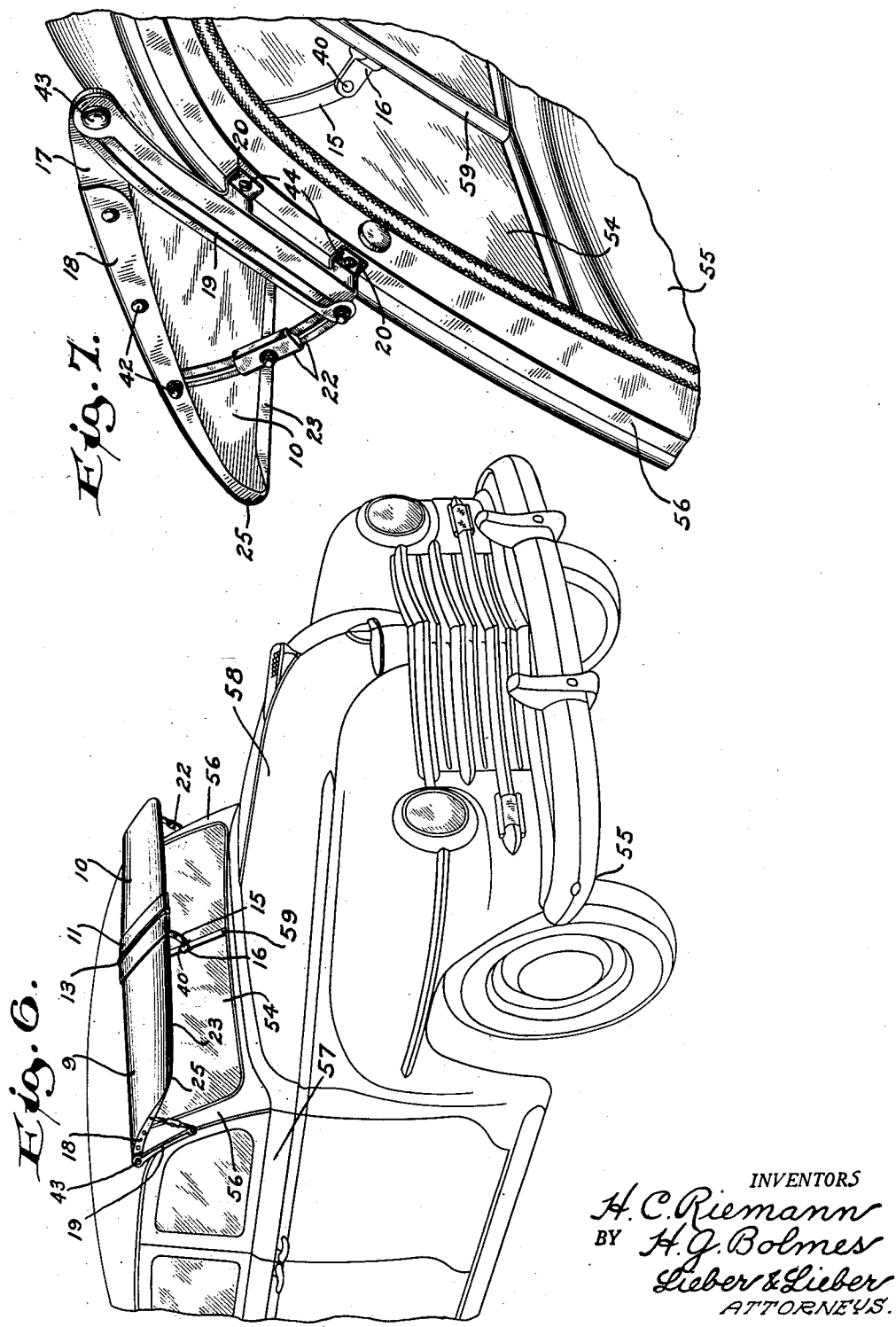
INVENTORS
H. C. Riemann
BY H. G. Bolmes
Lieber & Lieber
ATTORNEYS.

Patented May 2, 1950

2,506,108

UNITED STATES PATENT OFFICE 2,506,108

VEHICLE WINDSHIELD VISOR

Howard C. Riemann, West Allis, and Henry G. Bolmes, Milwaukee, Wis., assignors to The Fulton Company, West Allis, Wis., a corporation of Wisconsin Application November 25, 1946, Serial No. 712,216

2 Claims. (Cl. 296—95)

Our present invention relates generally to improvements in the art of manufacturing vehicle accessories, and relates more specifically to improvements in the construction and operation of visors especially adapted to be associated with the windshields of automobiles and the like.

It has heretofore been proposed to provide various types of visors or shields disposed above and extending forwardly beyond the front windshields of automobiles, for the purpose of protecting the driver's vision against sun and other intense light glare, and for also preventing undesirable accumulation of snow, sleet and other vision obstructions upon the windshield exteriors; and while some of these prior devices have gone into relatively extensive commercial use, they are all more or less objectionable for various reasons. The primary objections to most of the prior external windshild visors, is the fact that they are composed of rather frail material such as fabric which will readily deteriorate when exposed to inclement weather, and many of these prior accessories are flimsily attached to external portions of the vehicles and may therefore be easily stolen. Then too, some of the prior devices of this type are not sufficiently rigid to resist distortion when their carrier cars are travelling at high speed or in windy weather, and most of the previous windshield visors detract from rather than to improve the aesthetic appearance of the vehicles with which they are associated. Some of these prior shield assemblages moreover cannot be readily adjusted and sturdily maintained in various positions of adjustment, nor can they be applied to vehicles having different widths, thus making all of these prior visor assemblages unsuitable for all conditions of operation and use.

It is therefore an object of our present invention to provide an improved vehicle windshield visor which obviates all of the above mentioned objections, and all essential parts of which may be sturdily constructed of sheet metal or the like with the aid of punches and dies, and thereafter readily assembled.

Another important object of the present invention is to provide an improved windshield visor assemblage which may be firmly attached to the automobile bodies in such a manner that the accessory cannot be removed without destruction when the vehicle doors are locked, and which may also be readily adjusted to fit various types of cars and to meet the requirements of any driver.

A further object of this invention is to provide an improved windshield protector which conforms to the streamlining of the vehicles to which it is applicable, thereby enhancing the aesthetic appearance of such vehicles, and which may also be manufactured at moderate cost and readily attached to most standard enclosed automobiles with the aid of simple and readily available tools.

Still another object of the invention is to provide a visor for the front windshields of automobiles or the like, which is sufficiently strong and durable to resist distortion due to wind pressures, and deterioration resulting from prolonged exposure to inclement weather conditions, and which moreover presents a neat and highly finished appearance at all times.

An additional object of our invention is to provide an improved windshield visor accessory which is simple in construction, and which may also be readily dismantled for compact packing, storage or shipment, but which may be just as conveniently assembled for application to a vehicle.

These and other objects and advantages of the invention will be apparent from the following detailed description.

A clear conception of the several features constituting our present improvement, and of the construction and operation of a typical automobile windshield visor embodying the invention, may be had by referring to the drawings accompanying and forming a part of this specification in which like reference characters designate the same or similar parts in the various views.

Fig. 1 is a top view of one our our improved vehicle windshield protective visors showing the same fully assembled and ready for application to a vehicle;

Fig. 2 is a front elevation of a fragment of the panel assembly of the visor shown in Fig. 1;

Fig. 3 is a somewhat diagrammatic transverse vertical section through the same visor assemblage, the section having been taken along the line 3—3 of Fig. 1;

Fig. 4 is a considerably enlarged similar transverse vertical section through the visor, taken centrally along the line 4—4 of Fig. 1;

Fig. 5 is a similarly enlarged section taken transversely through the central clamping plates and strip of the visor assemblage, showing fragments of the panels confined between the plates;

Fig. 6 is a front and side perspective view of the major portion of a standard sedan type automobile having one of our improved visors installed and showing the doors closed; and Fig. 7 is an enlarged perspective view of a fragment of the same installation, but showing the door open and looking into the car enclosure through the windshield.

While the invention has been shown and described herein as being advantageously applicable to windshield visors for standard enclosed automobiles, it is not our desire or intent to unnecessarily limit the scope or utility of the improved features by virtue of this specific embodiment, since some of the improvements may obviously be applied to other types of vehicles for land, air or water transportation.

Referring to the drawings, the improved windshield visor unit or accessory, shown therein by way of illustration, comprises in general two oppositely inclined, longitudinally rectilinear, transversely curved panels 9, 10 firmly but adjustably interconnected at their adjacent ends by top and bottom center plates 11, 12 respectively, and by an upper center strip 13; a curved center prop or brace 15 of fixed length pivotally suspended from the top plate 11 and having an attaching clip 16 likewise pivotally suspended from its lower end; a reenforcing arm 17 firmly secured to an outer integral flange 18 depending from each panel 9, 10; a frame or mounting bracket 19 swingably secured to the rear end of each arm 17, each bracket 19 being provided with two or more integral attaching flanges or lugs 20; and a longitudinally adjustable link or brace 22 pivotally connected to the forward end of each arm 17 and to the corresponding end of the adjacent bracket 19.

The longitudinally straight but transversely curved panels 9, 10 are preferably formed of thin, light but relatively durable sheet metal with the aid of punches and dies, and these panels besides being stiffened by their curvature and by the integral end flanges 18 thereof, are also provided with rather large integral front and rear beads 23, 24 respectively, extending throughout their entire lengths. The relatively inclined panels 9, 10 are of approximately parallelogram formation but the outer corner portions 25 are preferably rounded as shown, and the front beads 23 merge into the side flanges 18 at these rounded corners 25 thereby further enhancing the rigidity of the panels.

The upper and lower center plates 11, 12 may also be formed of suitable sheet metal with the aid of punches and dies, being curved to conform with the curvature of the panels 9, 10; and the upper plate 11 is provided with downwardly extending integral lips 26 which coact with troughlike integral end flanges 27 formed on the bottom plate 12, to provide tubular sockets adapted to snugly receive the adjacent ends of the beads 23, 24 of the panels 9, 10, as illustrated in Figs. 4 and 5. The flat inner ends of the panels 9, 10 are adapted to be firmly but adjustably confined between the outer side edge portions of the plates 11, 12 at different distances from the center of the shield, by means of four screws 28 coacting with selected openings 29 formed in the flanges 27 of the bottom plate 12 and with four screw threaded openings in the adjacent beads 23, 24; and the top plate 11 is provided with one or more flanges 31 projecting through an opening in the bottom plate 12, while the plate 12 is medially stiffened and reenforced by a bulge 32 extending thereacross.

The center strip 13 may be formed of any durable material and has downwardly curved front and rear end flanges 33, 34 respectively, which are snugly cooperable with the plate lips 26 and flanges 27; and the strip 13 is likewise longitudinally curved and is provided with several integral clamping bosses 35 against which the plates 11, 12 are adapted to be firmly clamped by means of screws 36. The longitudinally curved center prop or brace 15 may also be stamped from sheet metal and has its upper end swingably secured to the flange 31 by a pivot pin 38, while its lower end is secured to the fastening clip 16 by means of a similar pivot pin 39. These pins 38, 39 permit the prop 15 to be disposed at various angles relative to the visor shield proper, and also permit the clip 16 to be disposed at various angles relative to the brace itself; and the clip 16 consists of a pair of jaws or gripping members which are adapted to be urged toward each other by a bolt or pivot pin 40, see Figs. 2, 3 and 4.

The reenforcing arms 17 may also be formed of sheet metal and may be firmly secured to the outer side flanges 18 of the panels 9, 10 by spot welding or with rivets 42, and these arms at the opposite sides of the visor are disposed approximately parallel to each other and extend rearwardly of the panel assemblage. The frames or brackets 19 should be formed of relatively heavy and durable sheet metal and are pivotally attached to the rear ends of the adjacent arms 17 by means of bolts 43 which should preferably be provided with suitable lock washers, and the attaching flanges 20 are provided with openings for the reception of attaching screws 44 as illustrated in Fig. 7. In order to stiffen the brackets 19, they may be provided with longitudinal ribs 45, and the forward ends of the frame brackets may be secured to the lower extremities of the adjacent props or braces 22 by means of other pivot bolts 46 provided with suitable lock washers.

The end braces 22 are adjustable in length as distinguished from the center prop 15, and each of the braces 22 is formed of an upper section 47 and a lower overlapping section 48 both adjustably coacting with a channel shaped connecting and clamping section 49. The three sections 47, 48, 49 of each prop 22 are adapted to be clamped together in various positions of adjustment, by means of a lock washer and bolt assemblage 50 coacting with slots 51 formed in the sections 47, 48; and the upper end of the upper section 47 is pivotally connected to the front extremity of the adjacent visor arm 17 by a bolt 52, while the lower extremity of the lower section 48 is likewise pivotally attached to the adjacent end of the corresponding bracket 19 by means of the pivot bolt 46. The prop sections 47, 48, 49 may all be formed of sheet metal with the aid of punches and dies, as is the case with all of the other major parts of the assemblage, and the various parts may also be painted, enameled or plated to match the vehicle with which the visor is to be associated.

When the improved windshield visor unit has been properly constructed and assembled as above described, it may be readily applied to the windshield 54 of an automobile 55 as depicted in Figs. 6 and 7, by first adjusting the length of the shield to correspond with the width of the particular vehicle, and by thereafter utilizing the bracket flanges 20 and screws 44 to firmly attach the brackets 19 with their pivot bolts 43 in axial alinement, to the opposite rigid side posts 56 which support the windshield 54 and also constitute the jambs for the front doors 57 of the car. The proper adjustment as to length of the visor may be readily effected by removing the screws 28 and releasing the clamping screws 36 and by sliding the panels 9, 10 toward or away from each other between the plates 11, 12 until the proper length is obtained, whereupon the screws 28, 36 may again be firmly applied to rigidly unite the loosened parts. The bracket flanges 20 are so formed that the attaching screws 44 must be applied in such a position that they will normally be totally concealed by the adjacent door 57 when the latter is closed; and when the doors 57 are closed and locked, it is impossible to manipulate the screws 44 so as to release or remove the supporting brackets 19.

After the length adjustment has been properly made and the brackets 19 have been properly positioned and attached to the posts 56, the angular position of the visor panel assemblage may be varied at will by releasing the clamping bolts 50 of the end props 22 and by thereafter swinging the panels 9, 10 upwardly or downwardly about the coaxial pivot bolts 43 until the front beads 23 are at the desired height above the engine hood 58. The clamping bolts 50 may then be actuated to firmly clamp the sections 47, 48, 49 of each brace 22 in adjusted position, whereupon the center brace 15 may be swung into proper position so that the attaching clip 16 at the lower end thereof may be firmly clamped to the central dividing bar 59 of the windshield 54, thereby completing the installation as shown in Fig. 6.

The angular adjustment of the visor panels 9, 10 so as to vary the gap between the front beads 23 and the hood 58 in order to meet the requirements of different drivers may be quickly effected with an ordinary wrench; but after proper setting has been accomplished, all of the pivot bolts 40, 43, 46, 50, 52 should be tightened to firmly retain the assemblage in adjusted position. When the visor has been thus properly adjusted and clamped in position, the driver's vision while being unobstructed, is effectively protected against sun glare and other intense light and the use of the customary internally mounted glare shields becomes unnecessary; and the improved external visor assemblage moreover prevents excessive accumulation of snow, sleet and other vision obstructing deposits on the windshield 54. The normally concealed and sturdy attachment of the main brackets 19 to the posts 56 with the aid of the flanges 20 and screws 44, not only provides a durable mounting for the assemblage but also prevents unauthorized removal of the accessory when the doors 57 are closed and locked.

From the foregoing detailed description it should be apparent that our present invention provides an improved vehicle windshield visor which besides being simple, compact and durable in construction, is also highly effective in actual use and flexible in its adaptations. The formation of the visor panels 9, 10 of metal instead of fabric or leather, besides prolonging the life of the shield, also permits ready streamlining of the visor to correspond with the streamlined curvature of the vehicle bodies, thus providing a highly aesthetic and pleasing appearance which may be augmented by coating the accessory the same color as the body to which it is applied. The improved assemblage is also extremely flexible in its adaptations because it may be conveniently and quickly adjusted so as to fit bodies having different widths, and because the angular disposition of the visor shield may be just as readily varied to meet various requirements. The construction of the visor of two panels 9, 10 which are detachably interconnected, also enables the manufacturer to compactly pack the dismantled assemblages for merchandising and shipment; and by producing the various parts of sheet metal with the aid of punches and dies, the cost of production is reduced to a minimum while maximum strength is obtained. The improved windshield visors have gone into successful use as applied to various types of standard automobiles, and may obviously be applied to numerous other vehicles wherein similar windshield protection and glare prevention is desirable.

It should be understood that it is not desired to limit this invention to the exact details of construction or to the precise mode of operation and use, herein shown and described, for various modifications within the scope of the appended claims may occur to persons skilled in the art; and it is also contemplated that specific descriptive terms used in the specification be given the broadest possible interpretation consistent with the disclosure.

We claim:

1. A vehicle windshield visor comprising, supporting brackets attachable to the vehicle at opposite ends of the windshield, and a rigid panel assemblage pivotally suspended from said brackets, said assemblage including upper and lower rigid center plates forming front and rear parallel tubular sockets and a pair of rigid panels each having front and rear integral parallel beads snugly telescopically confined within the adjacent sockets of said center plates, and screws for directly attaching each of said beads within the adjacent socket, said screws constituting the sole means for fastening said panels to said plates and the former being freely longitudinally adjustable and removable from the latter upon release of said screws.

2. A vehicle windshield visor comprising, supporting brackets attachable to the vehicle at opposite ends of the windshield, and a rigid panel assemblage pivotally suspended from said brackets, said assemblage including upper and lower rigid center plates curved from their front to their rear edges and forming front and rear parallel tubular sockets and a pair of rigid panels also curved from their front to their rear edges and each having front and rear integral parallel beads snugly telescopically confined within the adjacent sockets of said center plates, and screws for directly attaching each of said beads within the adjacent socket, said screws constituting the sole means for fastening said panels to said plates and the former being freely longitudinally adjustable and removable from the latter upon release of said screws.

HOWARD C. RIEMANN.
HENRY G. BOLMES.

REFERENCES CITED

The following references are of record in the file of this patent:

UNITED STATES PATENTS

| Number | Name | Date |
|---|---|---|
| 1,472,904 | Elliott | Nov. 6, 1923 |
| 1,502,382 | Grigsby | July 22, 1924 |
| 1,506,648 | Lamb | Aug. 26, 1924 |
| 1,615,078 | Grigsby | Jan. 18, 1927 |
| 2,034,342 | Hay | Mar. 17, 1936 |
| 2,180,909 | Peckat | Nov. 21, 1939 |
| 2,207,227 | Scott | July 9, 1940 |
| 2,253,353 | Sharp | Aug. 19, 1941 |
| 2,264,014 | Wohlfield | Nov. 25, 1941 |
| 2,334,856 | Atkinson | Nov. 23, 1943 |